United States Patent
Beyers et al.

(10) Patent No.: US 7,492,061 B2
(45) Date of Patent: Feb. 17, 2009

(54) TAPPED INTERPOSER FOR CONNECTING DISK DRIVE TO CHASSIS

(75) Inventors: Timothy M. Beyers, San Francisco, CA (US); Paul Gentieu, Sunnyvale, CA (US); Donald A. Blackwell, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 384 days.

(21) Appl. No.: 11/123,947

(22) Filed: May 6, 2005

(65) Prior Publication Data
US 2006/0139854 A1 Jun. 29, 2006

Related U.S. Application Data

(60) Provisional application No. 60/640,819, filed on Dec. 29, 2004.

(51) Int. Cl.
*H02J 1/00* (2006.01)
(52) U.S. Cl. ......................................................... 307/85
(58) Field of Classification Search .................... 307/85
See application file for complete search history.

(56) References Cited

U.S. PATENT DOCUMENTS

| | | | | |
|---|---|---|---|---|
| 4,490,775 A | * | 12/1984 | Quan | 361/686 |
| 5,579,204 A | * | 11/1996 | Nelson et al. | 361/685 |
| 5,823,790 A | * | 10/1998 | Magnuson | 439/63 |
| 6,160,408 A | * | 12/2000 | Fenton | 324/754 |
| 6,560,098 B1 | * | 5/2003 | Beinor et al. | 361/685 |
| 6,985,357 B2 | * | 1/2006 | Cauthron | 361/683 |
| 7,120,179 B2 | * | 10/2006 | Fennelly et al. | 372/38.02 |
| 7,172,346 B2 | * | 2/2007 | Mader et al. | 385/92 |

* cited by examiner

*Primary Examiner*—Robert L. Deberadinis
(74) *Attorney, Agent, or Firm*—Workman Nydegger

(57) ABSTRACT

Interposers for tapping a signal. An interposer can include an interposer printed circuit board, an output connector that couples the interposer circuit board with a backplane connector of a chassis, an input connector for coupling the interposer circuit board with a disk drive, tapping circuitry for tapping a high-speed differential signal, and connectors coupled to the tapping circuitry for transmitting the tapped signal to an analyzer or an oscilloscope.

25 Claims, 3 Drawing Sheets

TAPPED INTERPOSER FOR CONNECTING DISK DRIVE TO CHASSIS

CROSS-REFERENCE TO RELATED APPLICATIONS

This application claims the benefit of U.S. Provisional Patent Application No. 60/640,819 entitled "Tapped Interposer for Connecting Disk Drive to Chassis" filed Dec. 29, 2004, the contents of which is hereby expressly incorporated by reference herein.

BACKGROUND OF THE INVENTION

1. The Field of the Invention

The present invention relates to apparatuses that allow for data stream interconnect. More specifically, the present invention relates to interposers for tapping data associated with internally mounted electronic devices.

2. Background and Relevant Art

Computer and data communications networks continue to develop and expand due to declining costs, improved performance of computer and networking equipment, the remarkable growth of the internet, and the resulting increased demand for communication bandwidth. Such increased demand occurs within and between metropolitan areas as well as within communications networks. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of devices required to analyze data communicated in such data networks.

Monitoring, analysis, and testing of data flow typically require tapping into the data stream to capture or sample the data. Tapping into internally mounted devices, such as hard disk drive arrays or printed circuit board assembly (PCBA) arrays, can present significant challenges, however. These devices are typically mounted in a chassis frame or card cage with direct signal connections between the device (e.g. a PCBA) and a backplane or motherboard. In the case of Fibre Channel arbitrated loops there exist backplanes (e.g. JBOD (just a bunch of disks), RAID (Redundant Array of Inexpensive Ds), or Fibre Channel storage subsystems) that allow multiple hard disks to be directly attached to the loop. However, there is no mechanism to allow tapping of the data streams in between the backplane and the hard disk.

A method for tapping into the data stream of these systems can involve the use of a device called an interposer. An interposer typically consists of a PCBA with input and output connectors that match the connectors of the device and backplane. Although data is typically communicated bi-directionally through the interposer, the interposer connector that couples with the device connector is defined herein as the "input" connector and the interposer connector that couples with the backplane connector of the chassis is defined herein as the "output" connector.

There is a continuing need for improved interposers.

BRIEF SUMMARY OF THE INVENTION

The present invention relates to interposers for tapping a signal. An interposer can include an interposer printed circuit board, an output connector that couples the interposer circuit board with a backplane connector of a chassis, an input connector for coupling the interposer circuit board with a disk drive, tapping circuitry for tapping a high-speed differential signal, and a first pair of connectors coupled to the tapping circuitry for transmitting the tapped signal. Additional low-speed control signals being driven by the backplane or drive may also be overridden by the interposer.

According to another embodiment, an interposer can include a horizontal printed circuit board, a vertical printed circuit board, electrical connections coupling the horizontal printed circuit board to the vertical printed circuit board, means for coupling the interposer to a backplane connector of a chassis, means for coupling the interposer to a disk drive, and means for coupling the interposer to an analyzer.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to interposers. The interposers can include a PCB that is positioned in-line with a Fibre Channel (FC) arbitrated loop. The FC arbitrated loop can be of any type, size, and configuration. For example, some example embodiments of the present invention can include interposers for use with a 4.25 Gbps FC arbitrated loop. Other embodiments of the present invention can be substantially similar, but can be designed to tap communications systems operating at any other speed, for example a speed greater than 1 Gbps (e.g. between 2 and 10 Gbps).

A connector, as used herein, refers to a device designed to allow electrical flow from one wire or cable to a device on another wire or cable. A connector is any device that allows interruption of the circuit or the transfer to another circuit without any cutting of wire or cable or other preparation. For example, a SMA, as used herein, refers to a subminiature A connector commonly used in VHF, UHF, and microwave RF applications. An SFP connector is another example connector. It should be appreciated that use of a SMA connector or SFP connector in embodiments of the invention are by way of example only, and that any suitable high frequency connector can be used in any embodiments of the present invention, such as but not limited to those embodiments expressly described herein. Accordingly, connector means include SMA connectors, SFP connectors, and other connectors known in the art or developed hereafter which allow for interruption of a circuit or the transfer of data to another circuit without any cutting of wire or cable or other preparation.

Reference will now be made to the Figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of data systems have not been described in particular detail in order to avoid unnecessarily obscuring the present invention.

Figure 1:
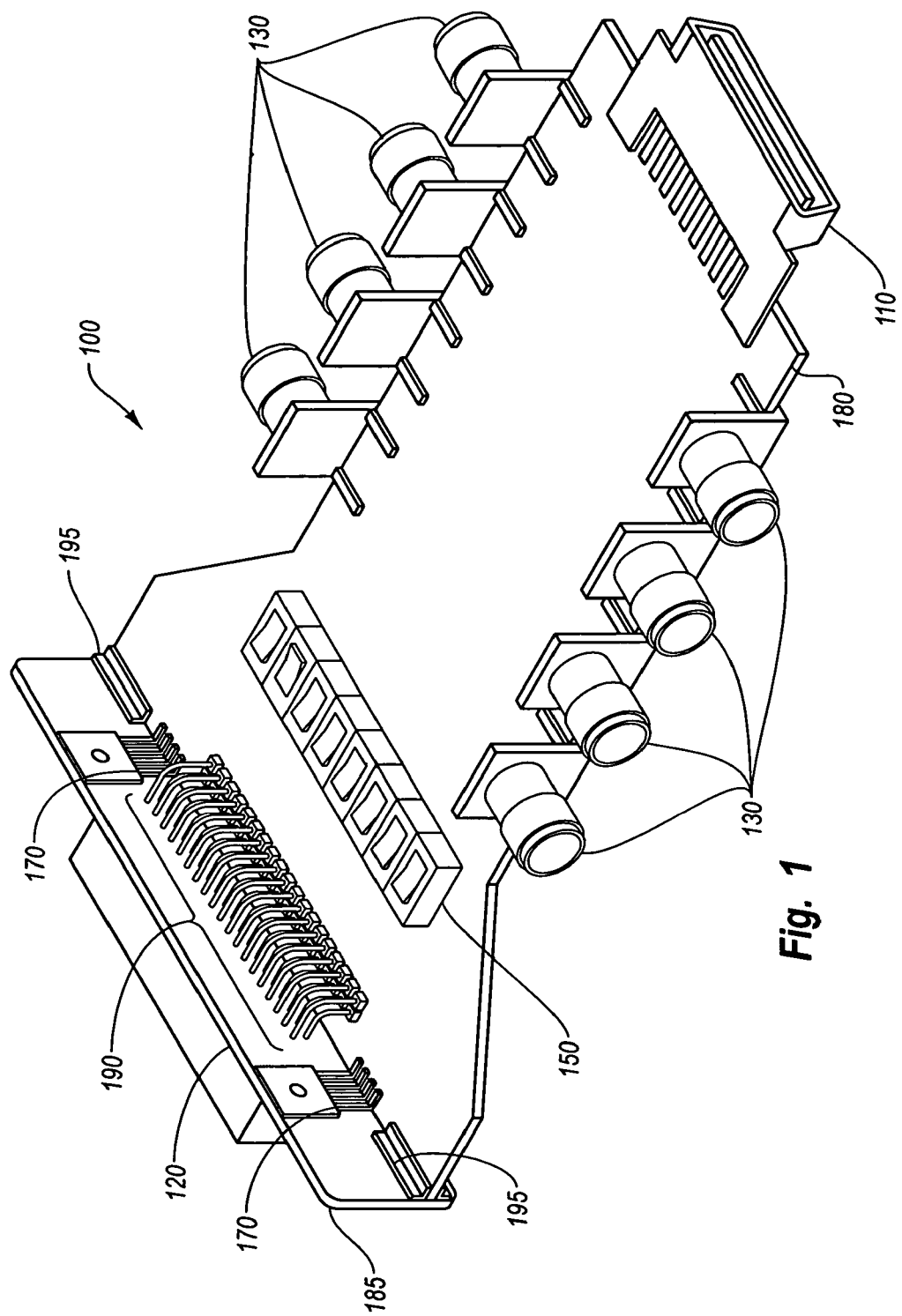
FIG. 1 illustrates an interposer according to an example embodiment of the present invention.

Referring to FIG. 1, an embodiment of a SMA FC interposer 100 is shown according to an example embodiment of the present invention. The interposer 100 can include an interface, such as a SCA-2 straddle mount plug 110 on a first side of the PCB. The SCA-2 straddle mount plug 110 can be configured to provide an electrical connection to a JBOD (Host) backplane. A second end of the interposer can include a SCA-2 vertical receptacle 120 for connecting to a fiber channel disk drive. The interposer PCB can include circuitry that enables a user to select and tap any number of the high-speed differential signals from both directions (e.g. in FC arbitrated loops there are two pairs of differential signals in each direction). The tapped signals from both directions can be routed to two pairs of SMA connectors 130. Additionally, there can be two additional pairs of SMA connectors 130 to allow data to be reinserted into the data path in a feature referred to as digital pass-through. Although the depicted embodiments illustrate eight connectors and do not denote which connectors may be paired with which or which are input or output devices, it will be understood that such delineations are not necessary because such distinctions are simple design variations that are not necessarily dependent upon a physical configuration of connectors on the interposer.

The circuitry of the FC interposer 100 can include an analog pass-through mode and a digital pass-through mode. The user can be allowed to select between analog or digital pass-through mode using a dip switch 150 or other device. The most effective non-intrusive method of observing the high-speed serial data is using the analog pass-through mode. This mode effectively duplicates a copy of the high-speed serial data. One copy of the high-speed serial data can be sent to the original destination, while a second copy of the high-speed serial data can be sent to the SMA connectors 130.

In operation, a coaxial cable can be connected to the appropriate SMA connectors 130 and can form a connection between the SMA connectors 130 and an oscilloscope or an analyzer, such as the 4.25 Gbps FC blade, for example. The output of the oscilloscope can be used to view the 'eye' pattern of the signal, for example. The signal received by an analyzer can be used for network analysis. One advantage of this mode of operation is that the high-speed signal that propagates between the Host and Drive, or between the Drive and Host, does not experience a retiming mechanism.

The digital pass-through mode can be implemented for products where there is a need to analyze, modify, and re-insert the high-speed serial data back into the FC loop in real-time. In this mode, the high-speed serial data can be passed to one pair of SMA connectors 130. A pair of coaxial cables can form a connection between the SMA connectors 130 and an analyzer, such as for example the 4.25 Gbps FC Blade. The data can be received by the analyzer, modified, retimed, and sent back to the interposer 100 via an additional pair of coaxial cables leading to a second pair of the SMA connectors 130. The interposer 100 can then pass the data on to the original destination.

An example configuration of the eight SMA connectors 130 can include a first pair of the SMA connectors 130 allowing data flow out from the interposer 100, from the Host to the analyzer. A second pair of the SMA connectors 130 can allow connectivity into the interposer 100 in the analyzer to the Host direction. A third pair of the differential SMA connectors 130 can allow connectivity out from the interposer 100, from the Drive to the Analyzer direction. Finally, a fourth differential pair of the SMA connectors 130 can allow connectivity into the interposer, from the Analyzer to the Drive direction. As previously noted, each pair of SMA connectors are illustrated collectively as connectors 130 because the precise identification of pairs in the illustration is not necessary.

The circuitry of the FC interposer 100 can further include selection between a first port and a second port of the fiber channel data path. The user can be allowed to select between the first and second ports using a dip switch 150 or other appropriate means. A Fibre Channel arbitrated loop inside a JBOD can allow data to travel full-duplex transmitting data in both directions simultaneously, as well as in one of the two loops. The two loops can be known as Port 1 and Port 2. Port 1 can be considered the primary loop, while Port 2 can be considered a redundant loop. The interposer may allow only one port in each direction to be observed/tapped at a time. Both analog and digital pass through modes can function for both ports. Selection of the pass through mode can be chosen for both data path directions independently.

Control of the interposer 100 can be accomplished using any appropriate means. According to an example embodiment of the present invention, means for controlling the interposer 100 can include using dip switches 150, and the dip switches 150 can be configured in any appropriate manner. For example, control of the interposer 100 can be accomplished using dip switches according to Chart 1 shown below.

CHART 1

| Dip-Switch Button | Data Direction | Functional Description | Button State = 'OFF' | Button State = 'ON' |
| --- | --- | --- | --- | --- |
| 1 | Host-to-Drive | Enables either Analog or Digital Pass-through for Port 1 | Analog | Digital |
| 2 | Host-to-Drive | Enables either Analog or Digital Pass-through for Port 2 | Analog | Digital |
| 3 | Host-to-Drive | Selects whether Port 1 or Port 2 data is routed to pair of SMA connectors | Port 1 | Port 2 |
| 4 | Drive-to-Host | Enables either Analog or Digital Pass-through for Port 1 | Analog | Digital |
| 5 | Drive-to-Host | Enables either Analog or Digital Pass-through for Port 2 | Analog | Digital |
| 6 | Drive-to-Host | Selects whether Port 1 or Port 2 data is routed to pair of SMA connectors | Port 1 | Port 2 |

The horizontal PCB 180 and vertical PCB 185 can be joined at three junctions. First, power as well as low-speed control signals used in Fibre Channel communication between the drives and the Host can be passively passed through the horizontal PCB 180 to the vertical PCB 185 via a right-angle connector 190. Second, large pads 195 (e.g. 1 cm in length) can be implemented on the horizontal PCB 180 and the vertical PCB 185. The pads 195 can be aligned on each PCB 180 and 185 so that they can be soldered together to allow a path for chassis ground between the Host and the Drive, and also for structural support. Finally, eight carefully engineered traces 170 can be implemented to allow the high-speed differential signals to traverse from the horizontal PCB 180 to the vertical PCB 185 maintaining a high degree of signal integrity. The pads 195 on the horizontal PCB can be aligned with the pads on the vertical PCB 185 with appropriate trace widths to ensure that the impedances are matched resulting in mechanical alignment of the two PCBs 180 and 185 with tight tolerances to ensure a carefully soldered right-angle joint forming the electrical connectivity.

To avoid powering the interposer 100 from an external power supply, methods of power distribution can be employed to allow the interposer 100 to be powered off the drives' power without excessive voltage drops. For example, the interposer 100 can be designed to be powered off of a power (e.g. a 5 volt or 12 volt power) being passed from the Host to the drive. Carefully sized traces can further ensure a minimum voltage drop across the PCB from Host to drive on a 12V and the 5V power lines.

Figure 2:
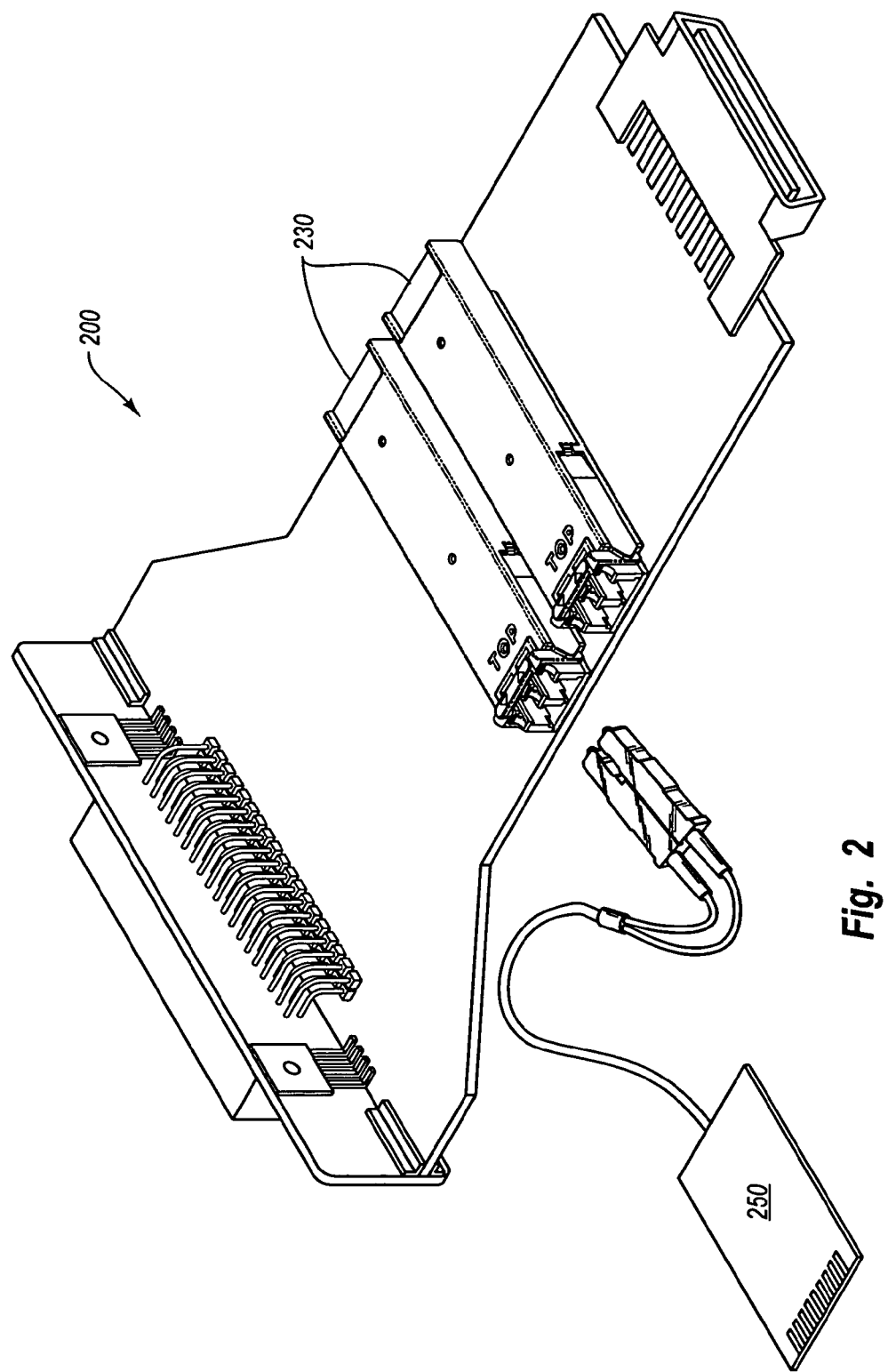
FIG. 2 illustrates an interposer according to another example embodiment of the present invention.

Referring to FIG. 2, two SFP connectors 230 can be used in place of the 8 SMA connectors 130 according to an example embodiment of the present invention. According to this example embodiment, the SFP connectors 230 can allow an optical module to interconnect the tapped signals directly to an analyzer blade 250, such as for example, the XGIG Analyzer blade made by Finisar Corporation.

According to another example embodiment of the present invention, the present invention can be implemented for serial attached SCSI (SAS). According to this embodiment, the interposer 200 can be positioned inline with a SAS drive and a SAS backplane. The SAS drive can have a dual port connector (e.g. SFF-8482) and the vertical backplane can have a corresponding receptacle.

Figure 3:
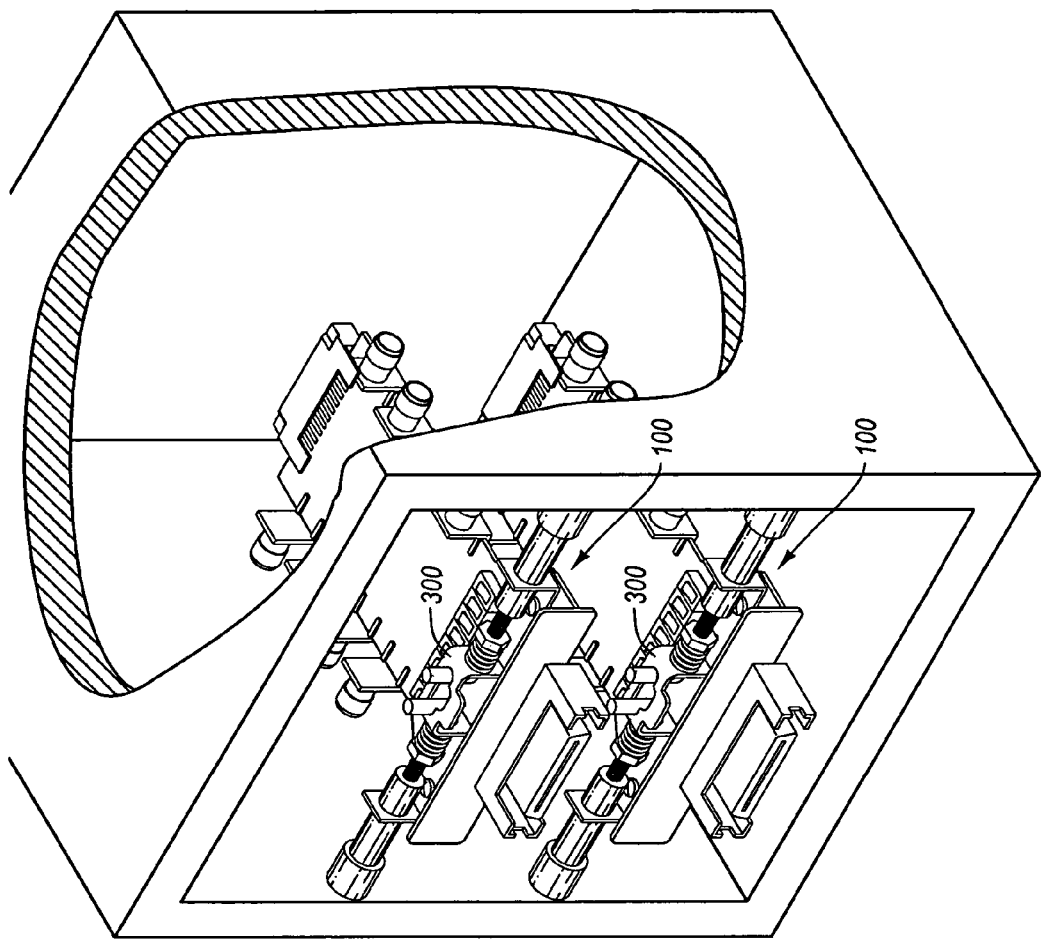
FIG. 3 illustrates a chassis with an array of interposers and associated adjustable support structures according to yet another example embodiment of the present invention.

The interposers (e.g. interposer 100 and 200) can be supported within electronic devices using any suitable means. For example, referring to FIG. 3, a plurality of interposers 100 can be supported by an adjustable support mechanism 300 as shown in FIG. 3 and described in further detail in U.S. Provisional Application No. 60/548,437 filed Feb. 27, 2004 entitled "Support Device and Extender Assemblies for Interposers," the contents of which are hereby incorporated herein by reference in its entirety. Thus, one aspect of the present invention can include an interposer that allows for network analyzer blades (e.g. Finisar XGIG blades) that monitor, analyze, and test network links to be used in a new and critical point in the data stream interconnect.

In one mode of operation the interposer can passively pass along all control signals between drive and host. In another mode of operation the interposer may override the control signals to force a desired mode of operation. For instance, during the power up procedure, the host may indicate the maximum supported speed for the high-speed signals. In certain test setups it can be desirable to override the speed control signals to force a certain speed in the drive. The interposer can include circuitry to force a certain speed in the drive and the circuitry can include several settings for allowing different speeds and a "normal" setting wherein JBOD and Drive dictate state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An interposer, comprising:
a printed circuit board;
an output connector for coupling the printed circuit board with a backplane connector of a chassis;
an input connector for coupling the printed circuit board with a disk drive;
tapping circuitry for tapping a signal; and
a first pair of connectors coupled to the tapping circuitry for transmitting the tapped signal, and the interposer including a digital pass through mode.

2. An interposer as defined in claim 1, wherein the disk drive is a Fibre Channel disk drive.

3. An interposer as defined in claim 1, wherein the first pair of connectors are SMA connectors.

4. An interposer as defined in claim 1, further comprising:
a second pair of connectors coupled to the tapping circuitry for viewing tapped signals transmitted in a direction opposite to that viewed by the first pair of connectors.

5. An interposer as defined in claim 4, further comprising:
a third pair of connectors and a fourth pair of connectors for reinserting data into the data path.

6. An interposer as defined in claim 1, wherein the first pair of connectors is a pair of SFP connectors.

7. An interposer as defined in claim 1, wherein:
the output connector is a SCA-2 straddle mount output connector that couples the interposer circuit board with the backplane connector of the chassis; and
the input connector is a SCA-2 vertical receptacle input connector for coupling the interposer circuit board with the disk drive.

8. An interposer as defined in claim 1, wherein the output connector is a serial attached SCSI (SAS) output connector that couples the interposer circuit board with a SAS backplane connector of the chassis; and
the input connector is a SAS vertical receptacle input connector for coupling the interposer circuit board with a SAS drive.

9. An interposer as defined in claim 1, wherein the interposer includes an analog pass-through mode that copies the high-speed serial data and sends one copy of the high-speed serial data to the original destination and another copy of the high-speed serial data to the first pair of connectors.

10. An interposer as defined in claim 1, wherein the interposer further includes an analog pass through mode, the interposer being switchable between the analog pass through mode and the digital pass through mode.

11. An interposer as defined in claim 1, further comprising:
a first port of a fiber channel data path for receiving a data stream; and
a second port of the fiber channel data path for receiving a data stream.

12. An interposer as defined in claim 1, further comprising:
one centimeter in length pads on a horizontal portion of the printed circuit board aligned with one centimeter in length pads on a vertical portion of the printed circuit board, wherein the interposer includes traces allowing for signals to traverse from the horizontal portion of the printed circuit board aligned to the vertical portion of the printed circuit board.

13. An interposer as defined in claim 1, wherein the interposer is powered from a power being passed between a Host and the disk drive.

14. An interposer as defined in claim 1, further comprising means for supporting the interposer within a chassis.

15. An interposer as defined in claim 1, further comprising circuitry configured to force a certain transmission speed in the drive.

16. An interposer comprising:
a horizontal printed circuit board;
a vertical printed circuit board;
electrical connections coupling the horizontal printed circuit board to the vertical printed circuit board;
an output interface for coupling the interposer to a backplane connector of a chassis;
an input interface for coupling the interposer to a disk drive;
a tapping circuit for tapping a signal; and
means for coupling the interposer to an analyzer or an oscilloscope; and
circuitry configured to force a certain transmission speed in the disk drive.

17. An interposer as defined in claim 16 wherein the means for coupling the interposer to an analyzer or an oscilloscope is at least one connector.

18. An interposer as defined in claim 16, wherein the at least one connector is at least one of a SFP connector or a SMA connector.

19. An interposer as defined in claim 16 wherein the interposer includes both an analog and a digital pass through mode.

20. An interposer as defined in claim 16, wherein the interposer includes two ports and a switch for selecting whether the data from the first port or from the second port is routed to a pair of connectors.

21. An interposer as defined in claim 16, wherein the interposer receives power from a Host or a disk drive.

22. An interposer as defined in claim 16, wherein:
the output interface is a serial attached SCSI (SAS) output connector; and
the input interface is a SAS vertical receptacle input connector for coupling the interposer circuit board with a SAS drive.

23. An interposer as defined in claim 16, further comprising:
an adjustable support device for supporting the interposer within a chassis, the adjustable support device comprising extendable arms for engaging opposing inner walls of the chassis.

24. An interposer as defined in claim 16, wherein the circuitry configured to force a certain transmission speed in the disk drive includes various settings for allowing different speeds, and further includes a "normal" setting.

25. An interposer comprising:
a horizontal printed circuit board;
a vertical printed circuit board;
electrical connections coupling the horizontal printed circuit board to the vertical printed circuit board;
an output interface for coupling the interposer to a backplane connector of a chassis;
an input interface for coupling the interposer to a disk drive;
circuitry enabling a user to select between an analog pass through mode and a digital pass through mode;
a tapping circuit for tapping a signal;
at least one connector for coupling the interposer to an attached device for analyzing the tapped signal; and
a power connection coupled to at least one of a Host and the disk drive, wherein the interposer receives power from the Host or from the disk drive.

* * * * *

UNITED STATES PATENT AND TRADEMARK OFFICE
CERTIFICATE OF CORRECTION

| | | |
|---|---|---|
| PATENT NO. | : 7,492,061 B2 | Page 1 of 1 |
| APPLICATION NO. | : 11/123947 | |
| DATED | : February 17, 2009 | |
| INVENTOR(S) | : Beyers et al. | |

It is certified that error appears in the above-identified patent and that said Letters Patent is hereby corrected as shown below:

Column 1
Line 10, change "is" to --are--

Column 3
Line 23, change "interposer" to --interposer 100--

Column 4
Line 27, change "interposer" to --interposer 100--

Column 5
Line 10, change "horizontal PCB" to --horizontal PCB 180--
Line 24, change "a 12V and the 5V power lines" to --12V and 5V power lines--

Column 7
Line 15, after "signal;" remove [and]

Signed and Sealed this

Twenty-second Day of February, 2011

David J. Kappos
*Director of the United States Patent and Trademark Office*